(12) United States Patent
Mejias et al.

(10) Patent No.: US 6,224,040 B1
(45) Date of Patent: May 1, 2001

(54) VEHICLE LIFT SYSTEM

(76) Inventors: Edgardo Mejias, 11 Kimberly Ave., Springfield, MA (US) 01108; Miguel L. Rosado, BDA Santo Domingo #3, Morouis, PR (US) 00687

( * ) Notice: Subject to any disclaimer, the term of this patent is extended or adjusted under 35 U.S.C. 154(b) by 0 days.

(21) Appl. No.: 09/466,081

(22) Filed: Dec. 17, 1999

(51) Int. Cl.$^7$ ........................................................ B66F 7/04
(52) U.S. Cl. ............................................................ 254/423
(58) Field of Search ............................. 180/8.5; 254/418, 254/423, 85, 84

(56) References Cited

U.S. PATENT DOCUMENTS

| | | | | |
|---|---|---|---|---|
| 1,099,405 | * | 6/1914 | Stein | 254/85 |
| 3,433,457 | * | 3/1969 | Van Der Ende | 254/423 |
| 4,321,976 | * | 3/1982 | Reinke | 180/8.5 |
| 4,883,576 | * | 11/1989 | Gemma | 180/8.5 |
| 5,143,386 | * | 9/1992 | Uriarte | 254/418 |
| 5,219,429 | * | 6/1993 | Shelton | 254/423 |
| 5,224,688 | * | 7/1993 | Torres et al. | 254/423 |
| 5,429,009 | * | 7/1995 | Wolfe et al. | 180/8.5 |

* cited by examiner

*Primary Examiner*—Robert C. Watson

(57) ABSTRACT

A vehicle lift system for lifting a corner of a vehicle by remote control. The vehicle lift system includes a rail system, a hydraulic jack mounted to and movable on the rail system, and a processor system for controlling the rail system. The rail system has a first rail, a second rail and third rail. The first rail comprises an elongate bar. The bar has a first end and a second end. Each of the ends of the bar has a mounting member thereon for mounting the rail to the vehicle. A second rail is substantially identical to the first rail, and is mounted to the bottom portion of the vehicle. The second rail is spaced from the first rail and is oriented generally parallel to the first rail. A third rail has a first and a second end, which are coupled to the first and second rails. The first and second rails are adapted to slide the third rail along a length of the first and third rails. The hydraulic jack has a base portion and a top portion. The base portion is adapted to slide along third rail. The third rail is adapted to move the hydraulic jack.

8 Claims, 6 Drawing Sheets

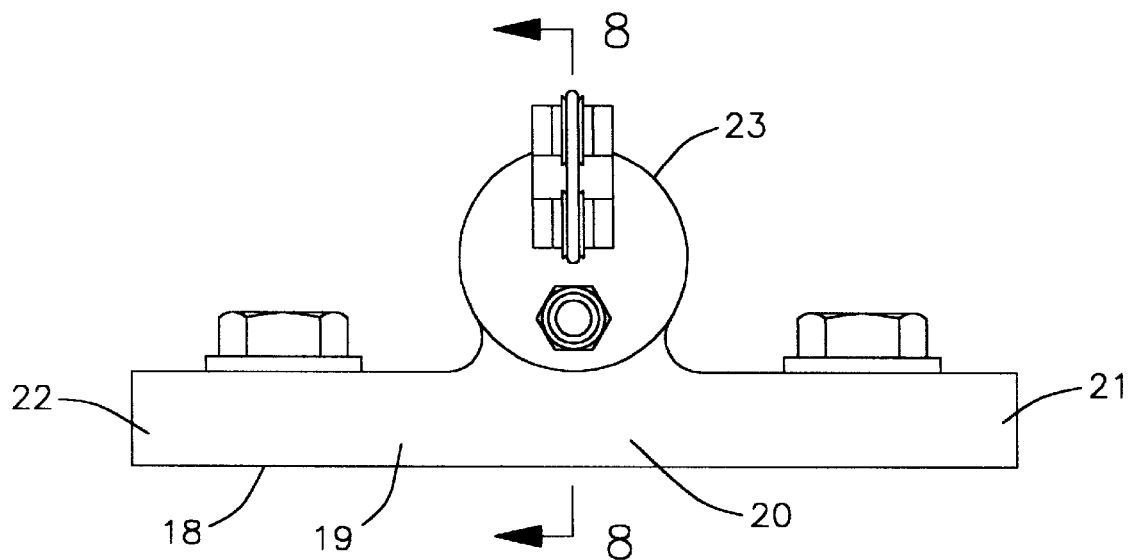
FIG. 7
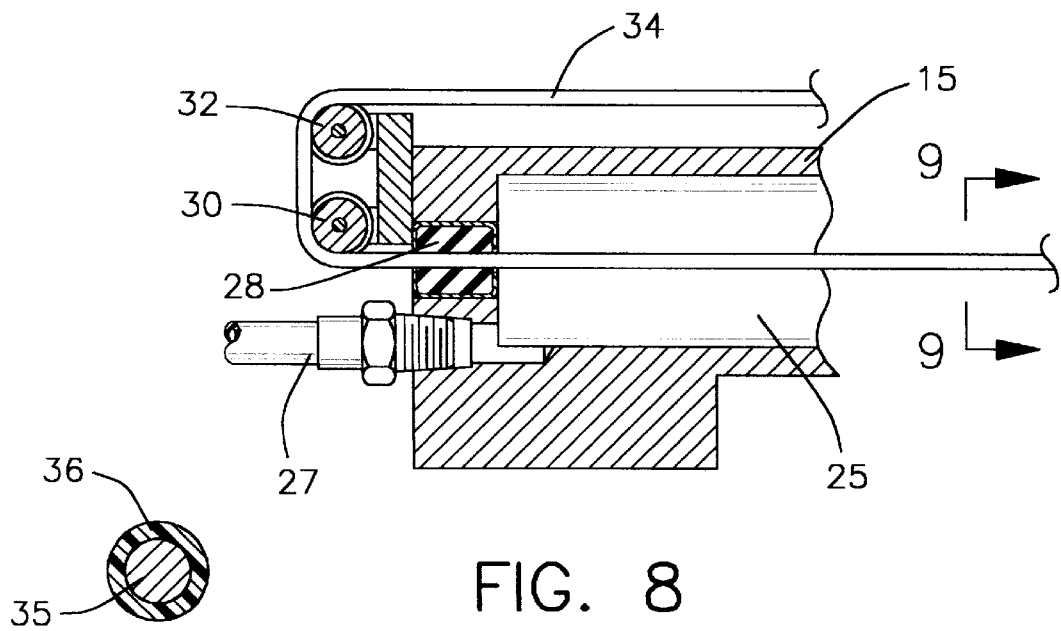
FIG. 8
FIG. 9

VEHICLE LIFT SYSTEM

BACKGROUND OF THE INVENTION

1. Field of the Invention

The present invention relates to lift systems and more particularly pertains to a new vehicle lift system for lifting a corner of a vehicle by remote control.

2. Description of the Prior Art

The use of lift systems is known in the prior art. More specifically, lift systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,224,688; U.S. Pat. No. 4,150,813; U.S. Pat. No. 1,907,208; U.S. Pat. No. 4,993,688; U.S. Des. Pat. No. 348,966; and U.S. Pat. No. 5,26,065 .

While these devices fulfill their respective, particular objectives and requirements, the aforementioned patents do not disclose a new vehicle lift system. The inventive device includes a rail system, a hydraulic jack mounted to and movable on the rail system, and a processor system for controlling the rail system. The rail system has a first rail, a second rail and third rail. The first rail comprises an elongate bar. The bar has a first end and a second end. Each of the ends of the bar has a mounting member thereon for mounting the rail to the vehicle. A second rail is substantially identical to the first rail, and is mounted to the bottom portion of the vehicle. The second rail is spaced from the first rail and is oriented generally parallel to the first rail. A third rail has a first and a second end, which are coupled to the first and second rails. The first and second rails are adapted to slide the third rail along a length of the first and third rails. The hydraulic jack has a base portion and a top portion. The base portion is adapted to slide along third rail. The third rail is adapted to move the hydraulic jack.

In these respects, the vehicle lift system according to the present invention substantially departs from the conventional concepts and designs of the prior art, and in so doing provides an apparatus primarily developed for the purpose of lifting a corner of a vehicle by remote control.

SUMMARY OF THE INVENTION

In view of the foregoing disadvantages inherent in the known types of lift systems now present in the prior art, the present invention provides a new vehicle lift system construction wherein the same can be utilized for lifting a corner of a vehicle by remote control.

The general purpose of the present invention, which will be described subsequently in greater detail, is to provide a new vehicle lift system apparatus and method which has many of the advantages of the lift systems mentioned heretofore and many novel features that result in a new vehicle lift system which is not anticipated, rendered obvious, suggested, or even implied by any of the prior art lift systems, either alone or in any combination thereof.

To attain this, the present invention generally comprises a rail system, a hydraulic jack mounted to and movable on the rail system, and a processor system for controlling the rail system. The rail system has a first rail, a second rail and third rail. The first rail comprises an elongate bar. The bar has a first end and a second end. Each of the ends of the bar has a mounting member thereon for mounting the rail to the vehicle. A second rail is substantially identical to the first rail, and is mounted to the bottom portion of the vehicle. The second rail is spaced from the first rail and is oriented generally parallel to the first rail. A third rail has a first and a second end, which are coupled to the first and second rails. The first and second rails are adapted to slide the third rail along a length of the first and third rails. The hydraulic jack has a base portion and a top portion. The base portion is adapted to slide along third rail. The third rail is adapted to move the hydraulic jack.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle lift system apparatus and method which has many of the advantages of the lift systems mentioned heretofore and many novel features that result in a new vehicle lift system which is not anticipated, rendered obvious, suggested, or even implied by any of the prior art lift systems, either alone or in any combination thereof.

It is another object of the present invention to provide a new vehicle lift system which may be easily and efficiently manufactured and marketed.

It is a further object of the present invention to provide a new vehicle lift system which is of a durable and reliable construction.

An even further object of the present invention is to provide a new vehicle lift system which is susceptible of a low cost of manufacture with regard to both materials and labor, and which accordingly is then susceptible of low prices of sale to the consuming public, thereby making such vehicle lift system economically available to the buying public.

Still yet another object of the present invention is to provide a new vehicle lift system which provides in the apparatuses and methods of the prior art some of the advantages thereof, while simultaneously overcoming some of the disadvantages normally associated therewith.

Still another object of the present invention is to provide a new vehicle lift system for lifting a corner of a vehicle by remote control.

Yet another object of the present invention is to provide a new vehicle lift system which includes a rail system, a hydraulic jack mounted to and movable on the rail system, and a processor system for controlling the rail system. The rail system has a first rail, a second rail and third rail. The first rail comprises an elongate bar. The bar has a first end and a second end. Each of the ends of the bar has a mounting member thereon for mounting the rail to the vehicle. A second rail is substantially identical to the first rail, and is mounted to the bottom portion of the vehicle. The second rail is spaced from the first rail and is oriented generally parallel to the first rail. A third rail has a first and a second end, which are coupled to the first and second rails. The first and second rails are adapted to slide the third rail along a length of the first and third rails. The hydraulic jack has a base portion and a top portion. The base portion is adapted to slide along third rail. The third rail is adapted to move the hydraulic jack.

Still yet another object of the present invention is to provide a new vehicle lift system that can be controlled from outside the vehicle to reduce risk to the operator of the vehicle when changing a tire.

Even still another object of the present invention is to provide a new vehicle lift system that has a jack mounted to the vehicle such that there is no danger of the jack slipping.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a schematic end view of the first rail of the first embodiment of the present invention.

FIG. 8 is a schematic cross-sectional view taken along line 8—8 of the present invention.

FIG. 9 is a schematic cross-sectional view of the cable of the present invention.

DESCRIPTION OF THE PREFERRED EMBODIMENT

Figure 1:
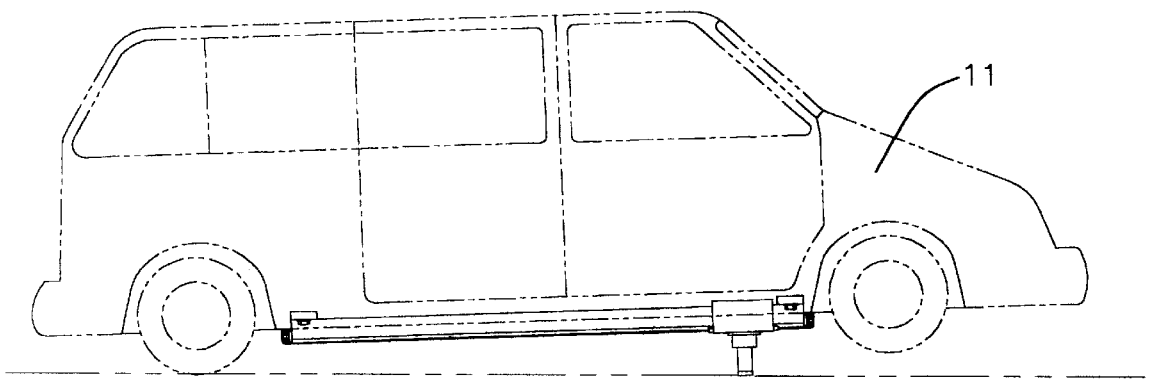
FIG. 1 is a schematic side view of a new vehicle lift system lifting a vehicle according to the present invention.

With reference now to the drawings, and in particular to FIGS. 1 through 14 thereof, a new vehicle lift system embodying the principles and concepts of the present invention and generally designated by the reference numeral 10 will be described.

As best illustrated in FIGS. 1 through 14, the vehicle lift system 10 generally comprises a hydraulic jack, mounted to and movable on a rail system that is mounted to the bottom of a vehicle 11. A processor system controls the rail system.

The rail system is made from a first 12, second 13 and third 14 rail. The first rail 12 has an elongate bar 15. The bar 15 has a first end 16 and a second end 17. Each of the ends of the bar has a mounting member 18 thereon for mounting the rail to the vehicle. Each of the mounting members comprises an arm 19 having a first end 21, a second end 22 and a middle portion 20. Each of the middle portions of the mounting members is fixedly coupled to one of the ends of the bars such that a portion of the arm 19 extends on either side of the bar 15. The bar 15 has a generally circular cross-section taken transverse to a longitudinal axis of the bar. Each of the ends has a peripheral edge 23.

A bore 25 in the bar 15 extends a length of the bar and extends through the first 16 and second 17 ends of the bar. The bore 25 has a generally circular cross-section taken transverse to the longitudinal axis of the bar.

A piston 26 is positioned within the bore 25. A pneumatic system 27 regulates air within the bore to move the piston 26 along the bore 25. Alternatively, a hydraulic system can be utilized to move the piston within the bore.

A pair of seals 28 maintains air or hydraulic pressure within the bore 25. Each of the seals 28 is fixedly mounted in an end of the bore. Each of the seals is located generally adjacent to one of the ends of the bar. Each of the seals has a bore therein.

A first pulley 30 wheel is rotationally mounted to the first 16 end of the bar 15 generally adjacent to one of the seals. A second pulley wheel 31 is rotationally mounted to the second end 17 of the bar 15 generally adjacent to the other of the seals. Each of the first 30 and second 31 pulley wheels has a rotational axis oriented generally parallel to a longitudinal axis of the arms 19 and perpendicular to the longitudinal axis of the bar 15.

A third pulley wheel 32 is rotationally mounted to the first end of the bar. A fourth pulley wheel 34 is rotationally mounted to the second end of the bar. Each of the third and fourth pulley wheels is located generally adjacent to a portion of the peripheral edges 23 opposite portions of the peripheral edge adjacent to the mountings 18. The third 32 and fourth wheels 33 each have a rotational axis oriented generally parallel to the rotational axes of the first 30 and second 31 wheels.

A cable 34, forming a continuous loop, runs over the pulley wheels. The cable 34 is coupled to the piston and extends through the bores in the seals. Preferably, the cable has a metallic core 35 which has a plastic coating 36.

A second rail 13 is substantially identical to the first rail 12. The second rail 13 is mounted to the bottom portion of the vehicle 11. The second rail 13 is spaced from the first rail 12 and is oriented generally parallel to the first rail.

The hydraulic jack 50 is mounted to a third rail 14. The third rail 14 functions in a substantially identical manner to the first 12 and second rails 13. One difference between the third rail 14 and the first 12 and second rails 13 is that each of the mountings 18 on the third rail 14 forms a block 38. Each of the blocks has a bore therethough. The bores in the blocks receive one of the bars 15 of the first 12 and second 13 rails such that one of the blocks is mounted on the first rail 12 and the other of the blocks is mounted on the second rail 13. The third rail 14 is oriented generally perpendicular to the first and second rails. Each of the blocks 38 is coupled to one the cables 34 on one of the first and second rails such that the third rail may be moved in relation to the ends of the first and second rails when the cables are moved by the pistons.

The third rail 15 also has a plate 40 on which the hydraulic jack 50 is slidably mounted. The plate 40 is fixedly mounted to the bar of the third rail 14. The plate 40 extends along a length of the bar of the third rail. The plate is on an opposite side of the bar of the third rail with respect to the blocks 38.

A sensor strip 42 for detecting the position of the hydraulic jack strip is fixedly embedded into the plate 40.

Figure 13:
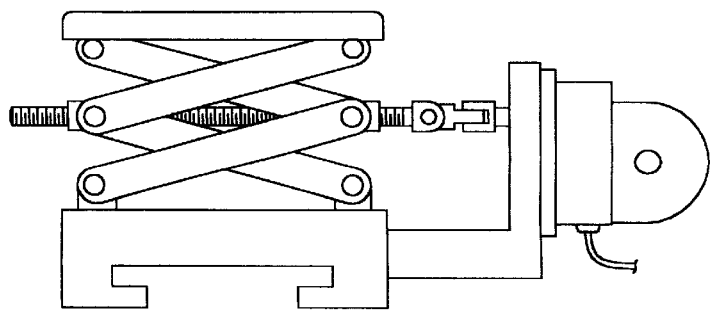
FIG. 13 is a schematic side view of an alternate jack.
Figure 14:
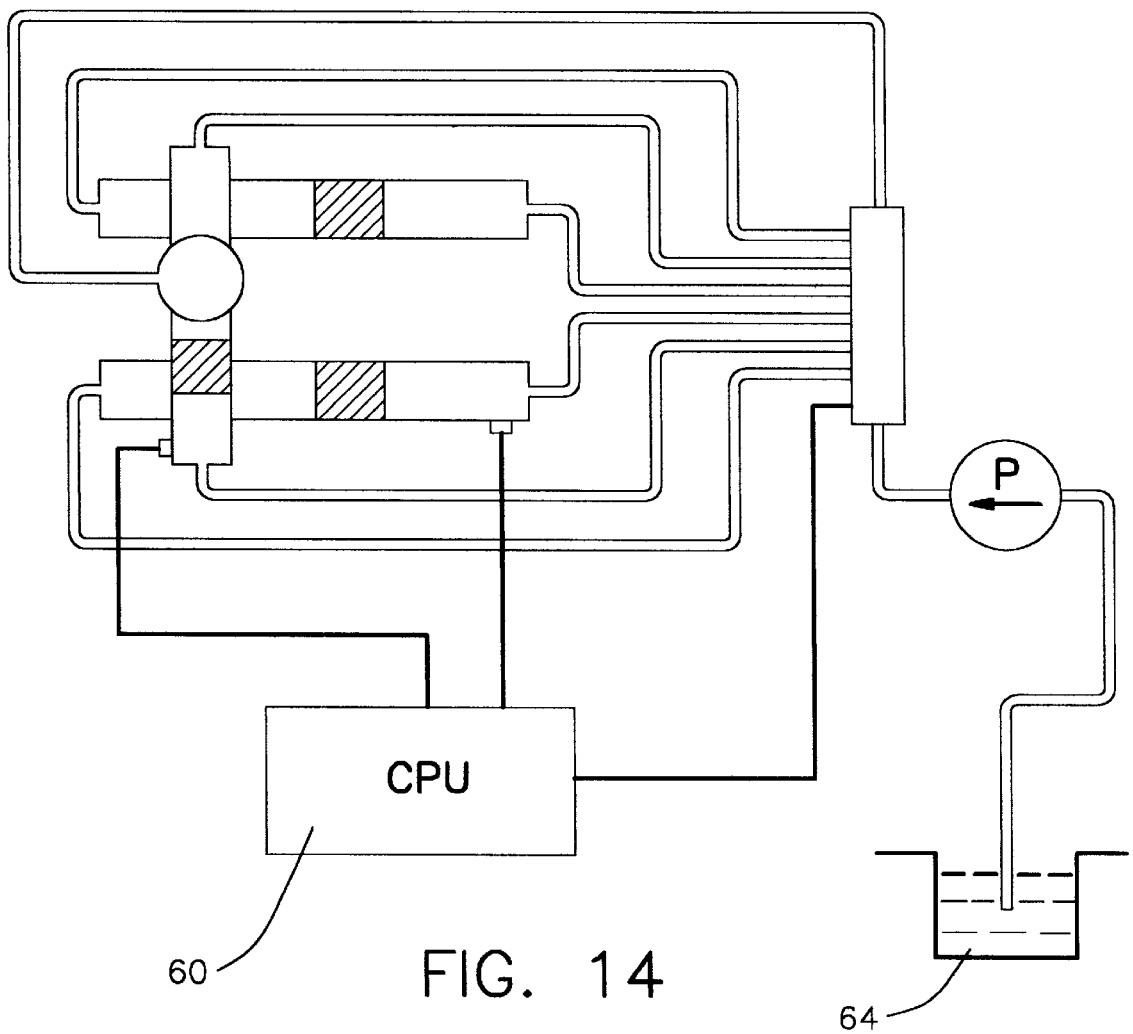
FIG. 14 is an electrical schematic of the first embodiment of the present invention.

The hydraulic jack 50 has a base portion 52 and a top portion 53. The base portion 52 is adapted to slide along the plate. The base portion 52 has a magnet therein 44, wherein the magnet 44 is located so as to contact the sensor strip 42. The top portion 53 of the hydraulic jack 50 is fluidly coupled to a hydraulic system. An alternate jack is best depicted in FIG. 13 which shows a standard scissors jack. Also, the jack could also be a pneumatic jack.

The processor 60 is operationally coupled to the hydraulic jack 50 and the rail system. The processor 60 is adapted to is programmable to move the hydraulic jack 50 to a corner of the vehicle and actuate the hydraulic jack.

A control box 62 for actuating the processor, the control box 62 is electrically coupled to the processor 60. The control box can be mounted in the trunk or back of the vehicle so that the corner of the vehicle can be raised without the person needing to be within the vehicle. The control box can also be remote control box.

A power supply 64, the power supply is operationally coupled to the processor. The power supply would generally be the car battery.

Figure 2:
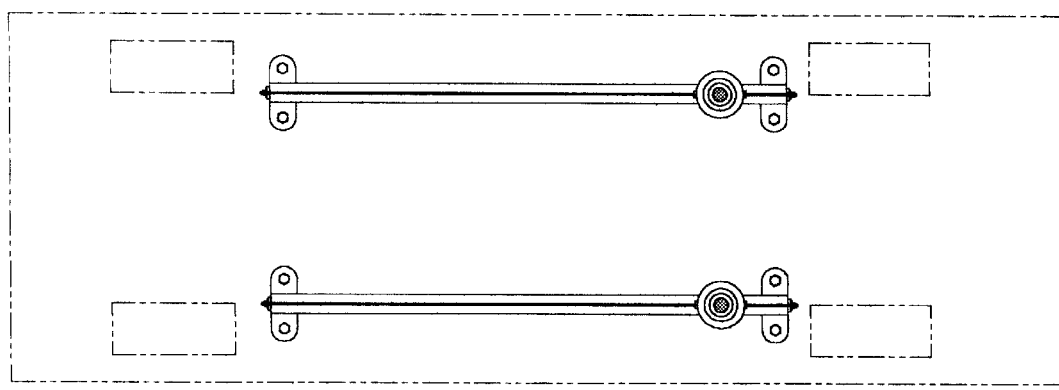
FIG. 2 is a schematic plan view of the second embodiment of the present invention.
Figure 3:
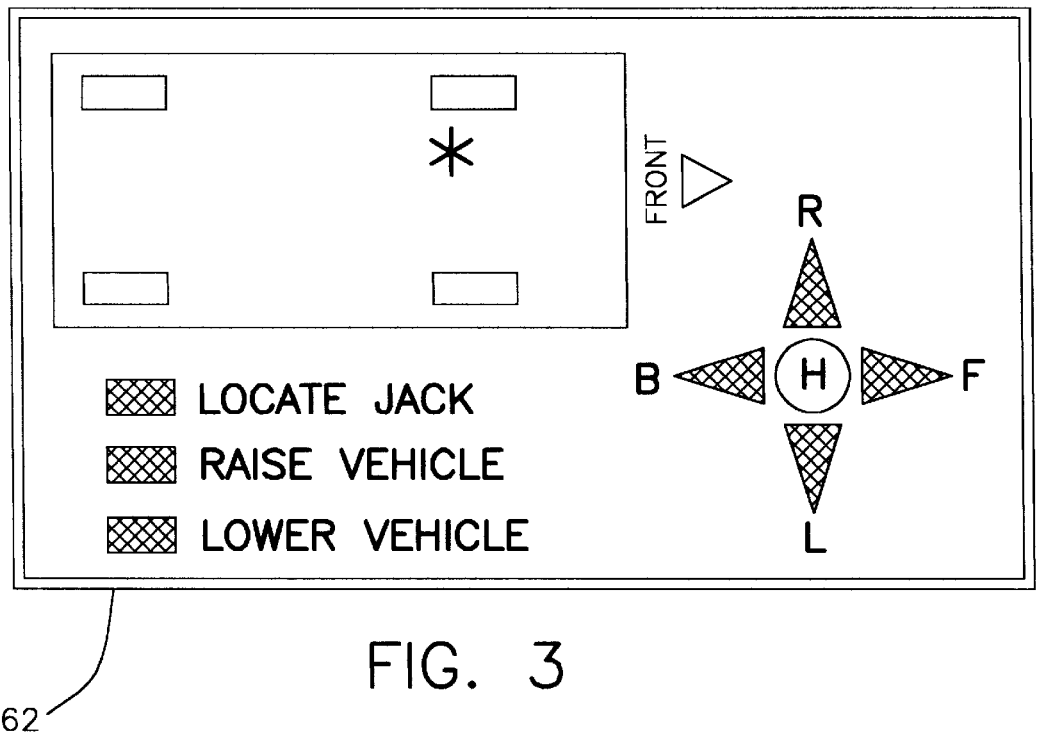
FIG. 3 is a schematic plan view of the control box of the present invention.
Figure 4:
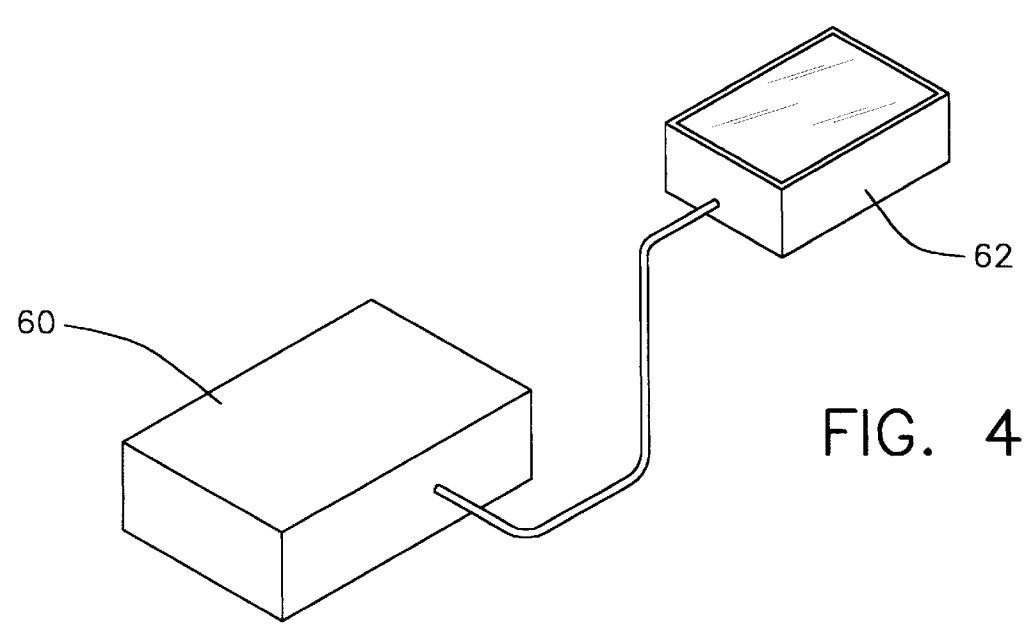
FIG. 4 is a schematic perspective view of the control box being operationally coupled to a processor of the present invention.
Figure 5:
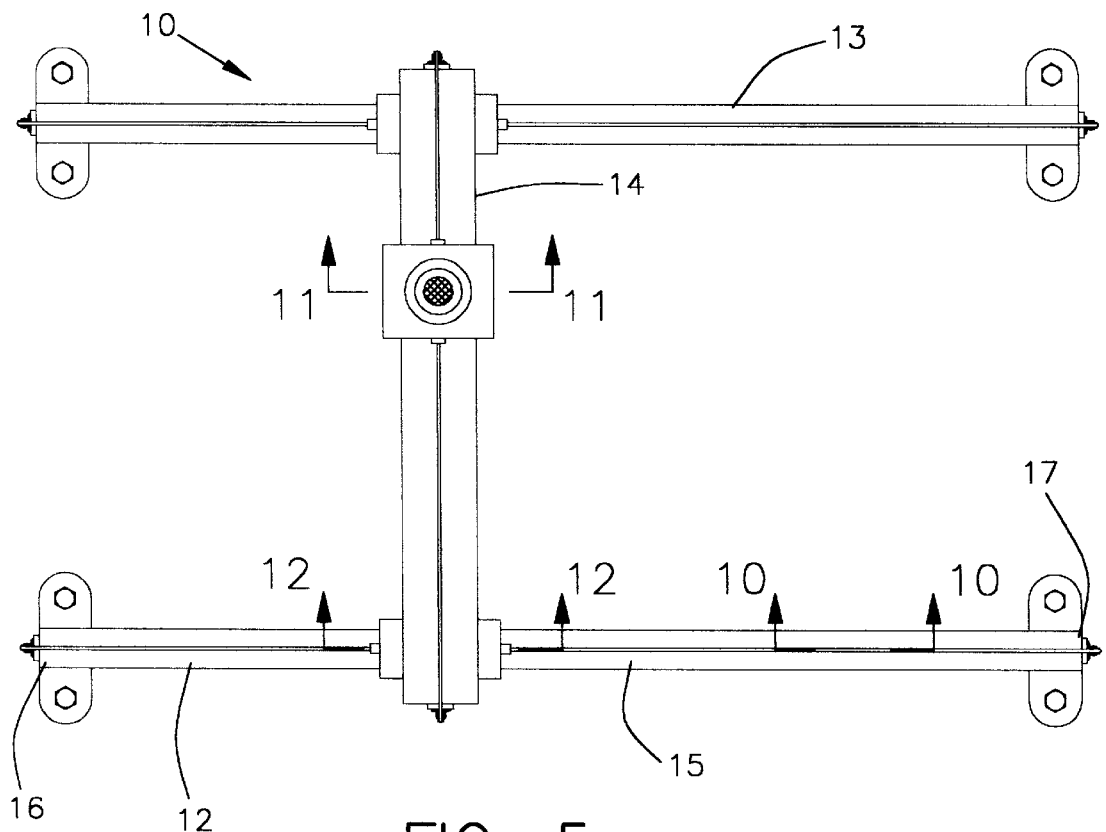
FIG. 5 is a schematic plan view of the first embodiment of the present invention.
Figure 6:
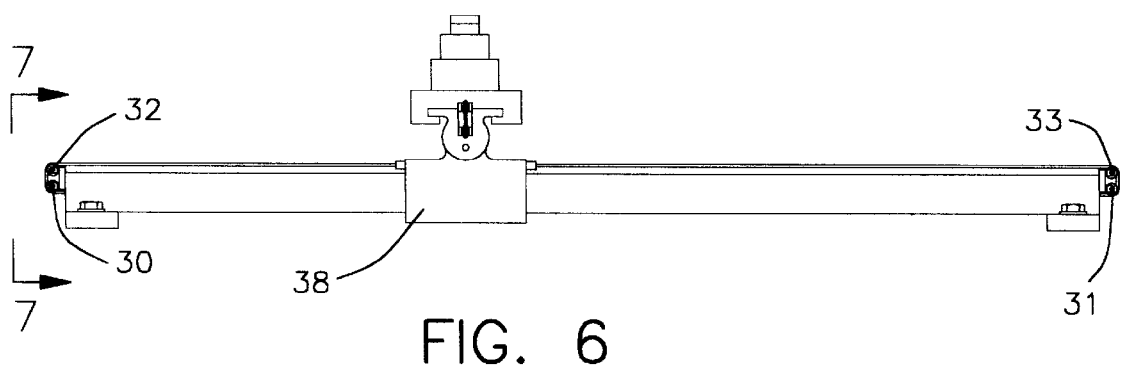
FIG. 6 is a schematic side view of the first embodiment of the present invention.
Figure 10:
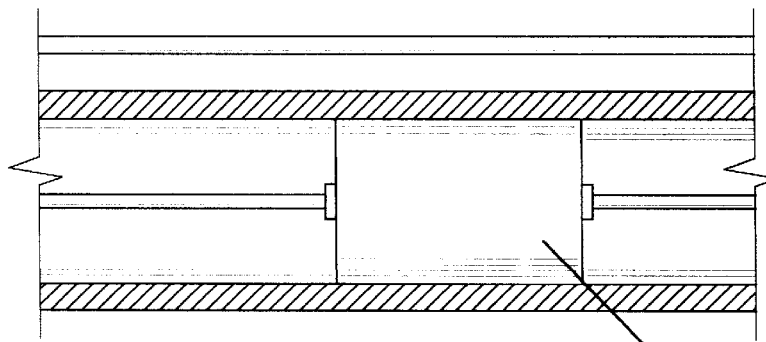
FIG. 10 is a schematic cross-sectional view taken along line 10—10 of the present invention.
Figure 11:
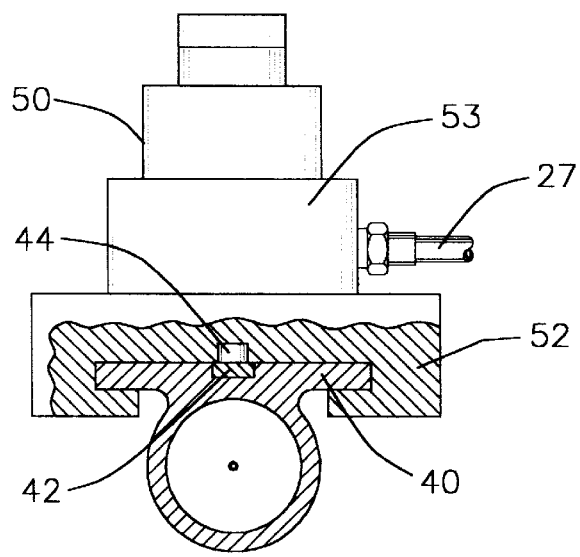
FIG. 11 is a schematic cross-sectional view taken along line 11—11 of the present invention.
Figure 12:
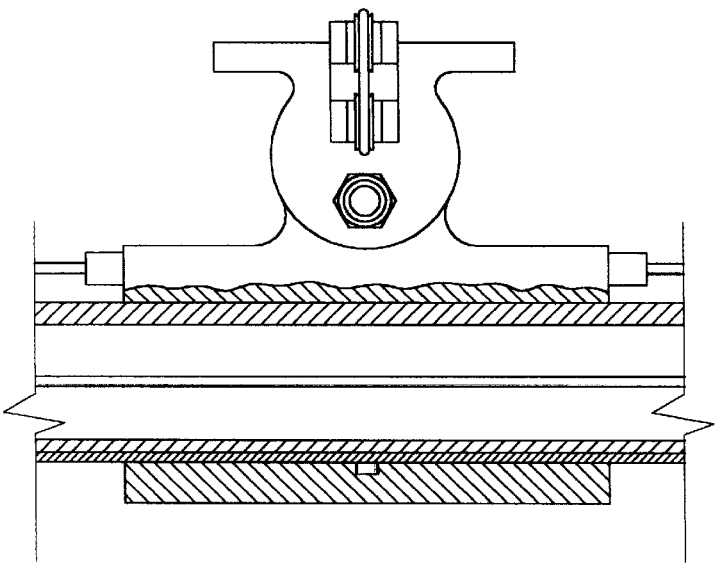
FIG. 12 is a schematic cross-sectional view taken along line 12—12 of the present invention.

Another embodiment, as best depicted in FIG. 2, uses only two rails which in which one is mounted on either side of the vehicle. In this embodiment, the mountings are like the mounting of the first and second rails of the first embodiment with an adapted bar to hold a jack like the third rail of the first embodiment.

In use, when a vehicle 11 has a flat tire, the user of the device uses the control box to direct the jack to the corner of the car where the flat is located. The user then uses the control box 62 to actuate the jack 50 and lift up that corner of the vehicle 11. When complete, the jack is simply commanded via the processor and control box to lower the corner of vehicle back to the ground.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A self contained vehicle lift system for selectively lifting a portion of a vehicle, the system being mountable to the bottom of the vehicle, said system comprising:

a rail system;

a pair of hydraulic jacks, mounted to and movable on said rail system;

said rail system comprising:
   a first rail and a second rail, each of said rails comprising:
      a bar, said bar being elongate, said bar having a first end and a second end, each of said ends of said bar having a mounting member thereon for mounting said rail to said vehicle;
      said second rail being spaced from said first rail, said second rail being oriented generally parallel to said first rail;

said hydraulic jacks having a base portion and a top portion, each of said base portions being adapted to slide along said first and second bars, said first and second rails being adapted to move each of said hydraulic jacks;

a processor system for controlling movement of said jacks along first and second bars, said processor being operationally coupled to said hydraulic jack and said rail system, said processor being adapted for being programmable to move said hydraulic jack to a corner of the vehicle and actuate said hydraulic jack;

said rail system further comprising:
   a bore in said bar, said bore extending a length of said bar and extending through said first and second ends of said bar, said bore having a generally circular cross-section taken transverse to said longitudinal axis of said bar;
   a piston, said piston being positioned within said bore, wherein a pneumatic system regulates air within said bore to move said piston along said bore;
   a pair of seals for maintaining air pressure within said bore, each of said seals being fixedly mounted in an end of said bore, each of said seals being located generally adjacent to one of said ends of said bar, each of said seals having a bore therein;
   a first and second pulley wheel, said first wheel being rotationally mounted generally adjacent to one of said seals said second wheel being rotationally mounted generally adjacent to the other of said seals, each of said first and second wheels having a rotational axis oriented generally parallel to a longitudinal axis of said arms and perpendicular to said longitudinal axis of said bar;

a third and fourth pulley wheel, said third pulley wheel being rotationally mounted to said first end of said bar, said fourth pulley wheel being rotationally mounted to said second end of said bar, each of said third and fourth pulley wheels being located generally adjacent to a portion of said peripheral edges opposite portions of said peripheral edge adjacent to said mountings, said third and fourth wheels each having a rotational axis oriented generally parallel to said rotational axes of said first and second wheels;

a cable, said cable forming a continuous loop, said cable running over said pulleys, said cable being coupled to said piston, said cable extending through said bores in said seals, said cable having a metallic core, said metallic core having a plastic coating; a plate, said hydraulic jack being mounted to said plate, said plate being fixedly mounted to said bar of said third rail, said plate extending along a length of said bar of said third rail, said plate being on an opposite side of said bar of said third rail with respect to said blocks;

a sensor strip for detecting the position of the hydraulic jack, said sensor strip being fixedly embedded into said plate;

said hydraulic jack having a base portion and a top portion, said base portion being adapted to slide along said plate, said base portion having a magnet therein, wherein said magnet is located so as to contact said sensor strip, said top portion of said hydraulic jack being fluidly coupled to a hydraulic system;

a control box for actuating said processor, said control box being electrically coupled to said processor; and a power supply, said power supply being operationally coupled to said processor.

2. A self contained vehicle lift system for selectively lifting a portion of a vehicle, said system comprising:

a vehicle having an underside;

a rail system mounted on the underside of the vehicle, said rail system including a pair of jacks; and a control system for controlling movement of said jacks on said rail system;

wherein said rail system comprises a first rail assembly and a second rail assembly, each of said rail assemblies comprising:

a bar mounted on the underside of the vehicle, the bar of each of said rail assemblies being oriented substantially parallel to a longitudinal axis of said vehicle in a laterally spaced, parallel orientation to the bar of the other of said rail assemblies, said bar having a bore therethrough extending along a longitudinal direction of said bar, a piston mounted at the bore of said bar in a manner permitting sliding movement of the piston in said bore;

wherein one of said jacks being mounted on the bar, said jack having a base portion and a top portion, said base portion of said jack being slidably mounted on said bar, said top portion of said jack being selectively extendable and retractable for engaging a around surface below said vehicle.

3. The vehicle lift system of claim 2 additionally comprising a cable loop having an interior portion extending through the bore and an exterior portion extending exteriorly of said bar, said piston being mounted to the interior portion of said cable loop such that movement of said piston in said bore produces movement of the interior portion of said cable loop with respect to said bore and movement of the exterior portion of said cable loop with respect to an exterior of said bar.

4. The vehicle lift system of claim 3, additionally comprising at least one guide pulley mounted at each end of the bar, the cable loop being reeved on each of the guide pulleys for permitting free movement of the cable loop through the bore.

5. The vehicle lift system of claim 3, additionally comprising a seal positioned at each end of the bore of said bar for permitting passing of the cable loop through the end of said bore while blocking air movement through the end of said bore.

6. The vehicle lift system of claim 2, additionally comprising a fluid pressure conduit in communication with the bore of said bar, the fluid pressure conduit being located adjacent a first one of said ends of said bar, the fluid pressure conduit permitting movement of fluid into and out of a portion of said bore located between said piston and said first end for controlling movement of said piston in said bore.

7. A self contained vehicle lift system for selectively lifting a portion of a vehicle, said system comprising:

a vehicle having an underside;

a rail system mounted on the underside of the vehicle, said rail system including a pair of jacks; and a control system for controlling movement of said jacks on said rail system;

wherein said rail system comprises a first rail assembly and a second rail assembly, each of said rail assemblies comprising:

a bar mounted on the underside of the vehicle, one of said jacks being mounted on said bar, the bar of each of said rail assemblies being oriented substantially parallel to a longitudinal axis of said vehicle in a laterally spaced, parallel orientation to the bar of the other of said rail assemblies, said bar having a bore therethrough extending along a longitudinal direction of said bar, a piston mounted at the bore of said bar in a manner permitting sliding movement of the piston in said bore; and a sensor strip for detecting the position of the jack on said bar, said sensor strip being fixedly mounted on said bar and extending in a longitudinal direction of said bar, a magnet mounted on the base portion of said jack for being sensed by said sensor, wherein said magnet is located so as to contact said sensor strip.

8. The vehicle lift system of claim 2, additionally comprising an elongate plate mounted on an exterior surface of said bar and extending in the longitudinal direction of said bar, the base portion of said jack being slidably mounted on said plate.

* * * * *